United States Patent
Thakur et al.

(10) Patent No.: US 11,231,979 B2
(45) Date of Patent: Jan. 25, 2022

(54) METHOD AND SYSTEM FOR GENERATING AN APPLICATION PROGRAMMING INTERFACE BASED ON DECLARATIVE SCHEMAS FOR INDIVIDUAL SERVICES

(71) Applicant: INTUIT INC., Mountain View, CA (US)

(72) Inventors: Aveer Ratan Thakur, Mountain View, CA (US); Michael J. Kogan, San Diego, CA (US); Banani Medhi, San Diego, CA (US); Peter Allen Vogel, Santa Clara, CA (US)

(73) Assignee: INTUIT INC., Mountain View, CA (US)

( * ) Notice: Subject to any disclaimer, the term of this patent is extended or adjusted under 35 U.S.C. 154(b) by 15 days.

(21) Appl. No.: 16/824,578

(22) Filed: Mar. 19, 2020

(65) Prior Publication Data
US 2021/0294679 A1  Sep. 23, 2021

(51) Int. Cl.
G06F 9/54 (2006.01)

(52) U.S. Cl.
CPC .............. G06F 9/548 (2013.01); G06F 9/546 (2013.01)

(58) Field of Classification Search
None
See application file for complete search history.

(56) References Cited

U.S. PATENT DOCUMENTS

| | | | |
|---|---|---|---|
| 9,753,744 B1 * | 9/2017 | Wells | |
| 10,585,720 B1 | 3/2020 | Kesler | |
| 10,949,178 B1 * | 3/2021 | Russell | |
| 2018/0165135 A1 | 6/2018 | Bahrami et al. | |
| 2019/0196890 A1 * | 6/2019 | Bucchi | |

FOREIGN PATENT DOCUMENTS

| | | |
|---|---|---|
| WO | 2017023276 A1 | 2/2017 |
| WO | 2017204952 A1 | 11/2017 |

OTHER PUBLICATIONS

Nikolas Burk, How to wrap a REST API with GraphQL—A 3-step tutorial, Feb. 22, 2018, pp. 1-26 (Year: 2018).*
PCT/US2020/033024, International Search Report and Written Opinion dated Nov. 25, 2020, 15 pages.

* cited by examiner

Primary Examiner — Syed A Roni
(74) Attorney, Agent, or Firm — Patterson + Sheridan, LLP (57) ABSTRACT

Certain aspects of the present disclosure provide techniques for generating an application programming interface (API) for a plurality of associated services. The method generally includes retrieving a declarative schema for a service of a plurality of services in an application programming interface (API). A language object for the service is generated from a data object definition in the declarative schema associated with the service. Generally, the language object is configured to handle data events generated by the service. A service controller for the service is generated from a service definition in the declarative schema associated with the respective service. Generally, the service controller is fronted by a gateway for external sources to invoke one or more functions implemented by the service. An application programming interface (API) is exposed for the service independently of details of APIs for the associated services to one or more external services.

20 Claims, 6 Drawing Sheets

METHOD AND SYSTEM FOR GENERATING AN APPLICATION PROGRAMMING INTERFACE BASED ON DECLARATIVE SCHEMAS FOR INDIVIDUAL SERVICES

INTRODUCTION

Aspects of the present disclosure relate to defining application programming interfaces (APIs) using object schemas, and more specifically to generating a framework of an API accessible through a graph generated from object schemas associated with each of a plurality of services.

BACKGROUND

Application programming interfaces (APIs) generally expose various routines and methods to software developers for use in obtaining and modifying data using features of a software application. These APIs may be accessible programmatically (e.g., as function calls programmed in an application or function library) or via a web resource for web-based applications. Web-based applications can invoke functionality exposed by an API, for example, using a Representational State Transfer function call (a RESTful function call). A RESTful call generally uses HTTP requests to invoke a function exposed by a web-based API and provide data to the invoked function for processing. In other cases, web-based applications can invoke API functions using queries encapsulated in an HTTP POST request, a Simple Object Access Protocol (SOAP) request, remote procedure call protocols (e.g., gRPC), or other protocols that allow client software to invoke functions on a remote system.

RESTful API design imposes a significant challenge to translate real-world noun/verb conventions into the limited verbs of the HTTP protocol (GET, POST, PUT, PATCH, DELETE) and the nouns of the problem domain handled by a given service. Differences, however minor, in the conventions adopted by individual services can lead to significant challenges in the user interface layer of an application that relies upon the individual service APIs. The use of RESTful services also leads to various inefficiencies such as over-fetching, in which data about a specific object in excess of what is needed to perform an action is retrieved, and underfetching, in which needed data about objects referenced by an initial data fetch is not retrieved and subsequent calls to the server may need to be performed.

Modern API systems, such as GraphQL seek to solve the problems of REST by defining a single, coherent API "graph" that is orchestrated to multiple microservices implemented using REST, SOAP, gRPC, or other protocols. Defining a single graph may solve many problems in handling differences in the conventions adopted by different services. However, defining a single, coherent API "graph" may also introduce an additional "layer" in the system which must be maintained and kept consistent with the capabilities of the underlying microservices as they evolve. This is especially challenging in an environment with many microservices and a fast release cycle where any given microservice may be rapidly released (e.g., multiple times per day or week).

Further, services or microservices may rely on data entities that are defined by each service. In a multilayer system where different objects for the same data entity are defined, multiple layers of mappings may be maintained, and each layer in the system may maintain its own business logic that maps an input data object to an output data object. The existence of these multiple layers of mappings and business logic may result in errors or inconsistencies of results generated within an application when business logic is not executed or executed multiple times.

Accordingly, techniques are needed to generate APIs and deploy services in a computing environment that are loosely coupled and can be efficiently maintained.

BRIEF SUMMARY

Certain embodiments provide a computer-implemented method for generating an application programming interface (API) for a plurality of associated services. The method generally includes retrieving a declarative schema for a service of a plurality of services in an application programming interface (API). A language object for the service is generated from a data object definition in the declarative schema associated with the service. Generally, the language object is configured to handle data events generated by the service. A service controller for the service is generated from a service definition in the declarative schema associated with the respective service. Generally, the service controller is fronted by a gateway for external sources to invoke one or more functions implemented by the service. An application programming interface (API) is exposed for the service independently of details of APIs for the associated services to one or more external services.

Other embodiments provide a system comprising a processor and a non-transitory computer-readable memory storing instructions that, when executed by the processor, perform an operation for generating an application programming interface (API) for a plurality of associated services. The operation generally includes retrieving a declarative schema for a service of a plurality of services in an application programming interface (API). A language object for the service is generated from a data object definition in the declarative schema associated with the service. Generally, the language object is configured to handle data events generated by the service. A service controller for the service is generated from a service definition in the declarative schema associated with the respective service. Generally, the service controller is fronted by a gateway for external sources to invoke one or more functions implemented by the service. An application programming interface (API) is exposed for the service independently of details of APIs for the associated services to one or more external services.

Still further embodiments provide a computer-readable medium having instructions stored thereon which, when executed, performs an operation for generating an application programming interface (API) for a plurality of associated services. The operation generally includes retrieving a declarative schema for a service of a plurality of services in an API. A language object for the service is generated from a data object definition in the declarative schema associated with the service. Generally, the language object is configured to handle data events generated by the service. A service controller for the service is generated from a service definition in the declarative schema associated with the respective service. Generally, the service controller is fronted by a gateway for external sources to invoke one or more functions implemented by the service. An application programming interface (API) is exposed for the service independently of details of APIs for the associated services to one or more external services.

The following description and the related drawings set forth in detail certain illustrative features of one or more embodiments.

BRIEF DESCRIPTION OF THE DRAWINGS

The appended figures depict certain aspects of the one or more embodiments and are therefore not to be considered limiting of the scope of this disclosure.

To facilitate understanding, identical reference numerals have been used, where possible, to designate identical elements that are common to the drawings. It is contemplated that elements and features of one embodiment may be beneficially incorporated in other embodiments without further recitation.

DETAILED DESCRIPTION

Application programming interfaces (APIs) for software architectures structured as a collection of services generally expose methods and procedures that software developers can use to build software applications using features provided by one or more of these services. Generally, each service in the collection of services may be built to implement a specific function or related set of functions. By implementing separate services for specific functions or related sets of functions, the maintainability of an application may be improved, as updates to a function may affect the service that implements the updated function and may not affect other services that use the updated function, assuming that the underlying contract defining the inputs and outputs of the updated function has not changed.

In some cases, each service may expose an API that allows other applications or services to invoke functions implemented by each service. The API may, for example, participate in a graph in which functions exposed in the API are represented as navigable paths through the graph starting from a root node representing an entry point into the API and terminating at a specific function to be invoked in the API. As the number of services in the collection of services increases, and as the number of functions exposed by each service increases, a graph representing the complete API of the system implemented by the various services may increase in size. In conventional systems, when functions are added, removed, or modified in a service in the collection of services, the API may be re-compiled and deployed to each of the services. While compiling and deploying an API may be a computationally inexpensive task for APIs structured as a smaller collection of services, increases in the number of services and the functions exposed by each service may cause the re-compilation and deployment of APIs to the collection of services to become more computationally expensive. Further, in a rapid development and rapid deployment environment, where services are continually updated, updates to services may be performed before updated APIs are compiled and deployed to each of the services. In such a case, processing resources spent to compile and deploy an API may be wasted, as the resulting compiled API may not include updates performed while the API was being compiled and deployed.

APIs may expose functionality in a variety of manners, such as using a Representation State Transfer (REST) model, a graph projection, and other projections of the functionality exposed by the API. While exposing the functionality of an API using various models or projections allows external services and applications to invoke functions exposed by the API using a variety of techniques, the API itself may be built using a definitional paradigm that may complicate or obfuscate the features of the API.

For example, the API may be built using a nouns-only REST approach, where entities defined as nouns in the API are acted upon using standard Hypertext Transfer Protocol (HTTP) verbs (e.g., HTTP POST, GET, PUT, or DELETE). Because the actions of the API may be limited to functions of creating (corresponding to HTTP POST), reading (corresponding to HTTP GET), updating (corresponding to HTTP PUT), and deleting (corresponding to HTTP DELETE), the functions invoked to perform simple operations, such as requesting that an e-mail be sent or that a calculation be performed on a transaction, may be represented by non-intuitive modifications of an underlying REST object interpreted by business logic for a service as a requirement to perform these operations. Therefore, a REST-based API may cause specific fields to be modeled into entities processed by the API, which may complicate the API by tightly coupling a definition of a service with a definition of the API.

Aspects of the present disclosure provide for the generation of APIs using declarative schemas associated with each service in a collection of services such that each service in the collection of services can be independently maintained and be loosely coupled to each other. A query orchestrator, such as the Apollo Federation Server, at a request gateway can expose an API to external services and software applications based on the declarative schemas associated with each service in the collection of services. Each individual service, defined by its own declarative schema, may have knowledge of the data and operations exposed and performed by the service, but need not have knowledge of the data and operations exposed by other services in the collection of services. By using declarative schemas to define individual services in a collection of services and the overall API exposing the functions of the individual services to external services or applications, each individual service may be independently maintainable such that changes to one service need not affect the functionality of other services in the collection of services. Further, each service in the collection of services need not externally expose the entire API, which may reduce complexity and resource utilization in compiling and deploying services in a computing environment.

Figure 1:
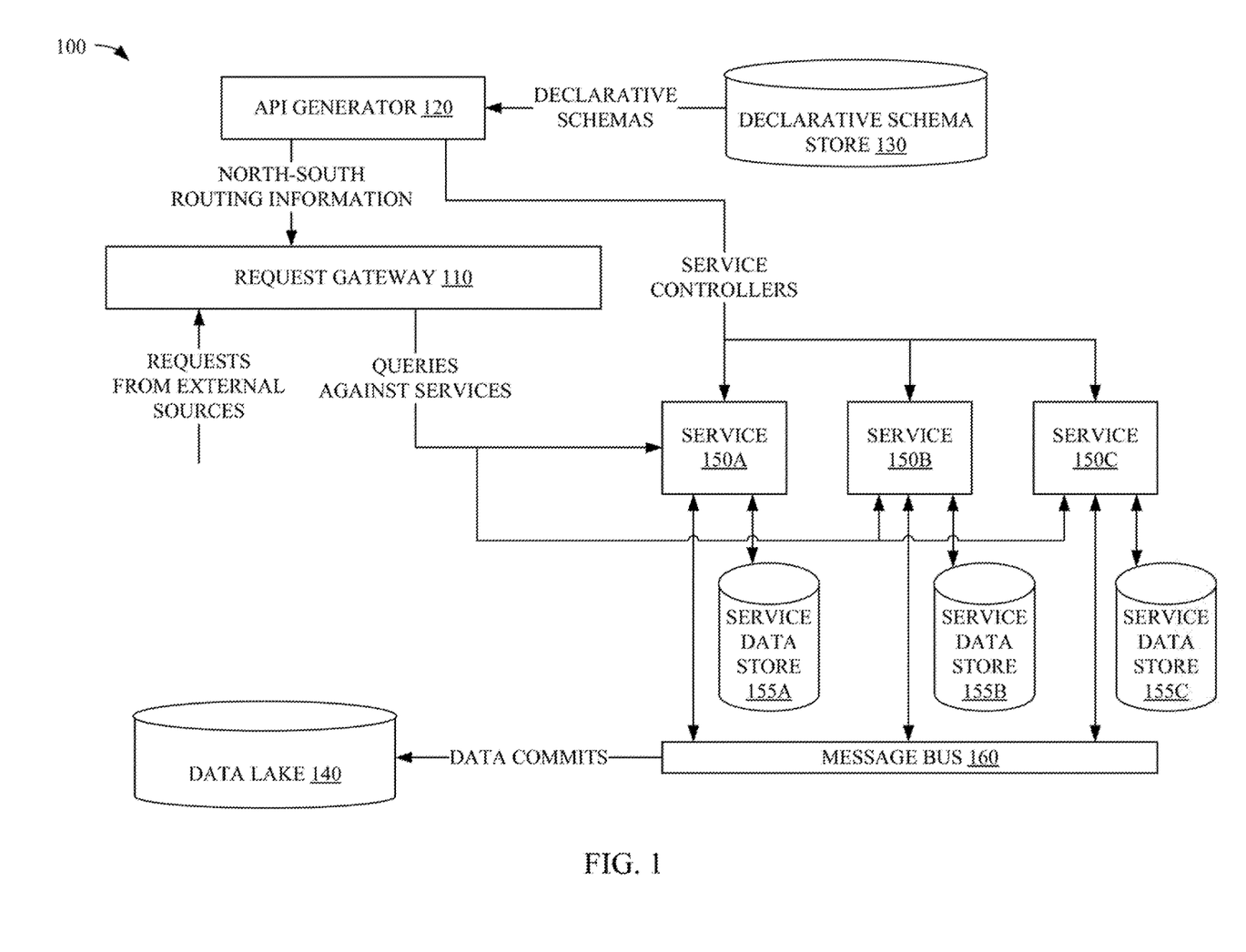
FIG. 1 depicts an example computing environment in which declarative schemas are used to generate an application programming interface (API) and to deploy services in a computing environment.

Example Generation of an Application
Programming Interface Based on Declarative
Schemas for Services in a Collection of Services FIG. 1 illustrates an example computing environment 100 in which declarative schemas associated with each service in a collection of related services are used to generate an application programming interface (API).

As illustrated, computing environment 100 includes a request gateway 110, an API generator 120, declarative schema store 130, data lake 140, a plurality of services 150, each service 150 being associated with a service data store 155, and a message bus 160. Computing environment 100 illustrates the generation and deployment of an API from declarative schemas associated with individual services in a collection of related services and code implementing the portion of the API associated with each individual service in the collection of related services in a client-server deployment. It should be recognized that the generation and deployment of an API from these declarative schemas may be performed on a single physical computing device (e.g., a server), a cluster of computing devices, a virtualized environment in which services are hosted by virtual machines executing on one or a cluster of computing devices, or any other computing environment in which an API can be generated and deployed for access and use by external software applications or services.

Request gateway 110 generally is representative of an single point of entry at which computing environment 100 receives a request to invoke a function exposed by one of the plurality of services 150 from an external source (e.g., an external service interfacing with the API exposed by computing environment 100, a software application executing on a client device, a web application executing on a remote server, etc.). Request gateway 110 can examine the received request against information defining the API to identify the one or more services to which the request is to be routed for execution. Upon receiving a response from the identified one or more services, request gateway 110 collects responses from the identified one or more services to produce a response for the requesting external source (e.g., an external client application). In some embodiments, request gateway 110 may receive a request from an external source for data from one service that references data handled by other services. To satisfy the request, request gateway 110 may make one or more further service calls to the appropriate services prior to providing a response to the external source.

In some embodiments, request gateway 110 may expose the API as a graph projection in which a graph query language is used to define a function invoked by a received request. The graph projection may be structured such that a node representing the request gateway 110 serves as the root node of the graph projection, and nodes at different levels of the graph represent different functions that can be invoked in the API. Any function in the API may be represented as a continuous navigable path through the graph projection of the API. In some embodiments, request gateway 110 may traverse the graph projection of the API to determine if a received request is a valid request (i.e., is a continuous navigable path through the graph projection of the API). If request gateway 110 determines that the request is a valid function call, request gateway 110 can identify the service(s) invoked by the request and route the request to the identified service(s) for execution. Otherwise, if request gateway 110 determines that the request is not a valid function call (e.g., is not a continuous navigable path through the graph projection of the API, is a request that includes nodes in the graph projection or data that a user is not authorized to access, etc.), request gateway 110 can return an error message to the external service or application from which the request was received. In some embodiments, the graph projection may include north/south routing information used to route requests to the appropriate service. Generally, north/south routing information may include the request gateway 110 as the point of entry, or the northmost point in the API, and the routing information may indicate a route south from the request gateway 110 to the appropriate service(s) 150 and service data store(s) 155.

To algorithmically build the graph projection of the API, request gateway 110 composes together the declarative schemas stored in declarative schema data store 130 defining each of the services 150 in computing environment 100. To compose the declarative schemas defining the services 150 into a graph projection of the API, request gateway 110 can examine the declarative schemas to identify references in an entity to entities associated with other services. For example, suppose that an API exposes a function for obtaining an invoice, and the invoice entity references user information entities and invoice line item entities. Based on the definition of the invoice entity in the API, request gateway can generate a graph projection with a node for retrieving an invoice acting as a parent node to a node for retrieving user information entities and a node for retrieving invoice line item entities, which may be defined by separate services and may include one or more operations for obtaining an entire entity or specific data from an entity.

In some embodiments, each service 150 may define API operations in terms of input and output data that allows for API-only fields to be added to entities in the API. To do so, services 150 may be layered with a plurality of layers. A first layer of services may handle basic Create/Read/Update/Delete logic for defined entities. Higher-layer services may implement deeper business logic and may expose more complex operations that may or may not involve direct manipulation of the state of an entity (e.g., to send an invoice via e-mail or process a credit card transaction prior to generating and storing a sales receipt). Further, request gateway 110 may reference code that provides a resolver (e.g., through a higher-layer service) for the API-only fields and may use information defining API-only read operations that identify the entity to be resolved and the cardinality of the result (i.e., the number of entities returned in response to the API-only read operations).

Request gateway 110 may be updated periodically with information about changes to the API as such changes are deployed within computing environment 100. As discussed in further detail below, API generator 120 can verify that changes to a declarative schema associated with a specific service in the collection of services is compatible with other services in computing environment 100. If API generator 120 verifies that the changes to a declarative schema are compatible with other services in computing environment 100, API generator 120 can generate an updated graph projection of the API and deploy the updated graph projection of the API to request gateway 110. In some embodiments, update operations may be invoked by a service 150 having an updated declarative schema by the service 150 transmitting the updated declarative schema to request gateway 110 for processing.

During the update process, request gateway 110 may request that API generator 120 compile the updated declarative schema and verify that the updated declarative schema is backward compatible with previous versions of the declarative schema for the service and that entity definitions in the declarative schema do not conflict with other entity definitions in the API. If API generator 120 indicates to request gateway 110 that the updated declarative schema is validated, request gateway 110 may invoke a heartbeat operation at the service 150 associated with the updated declarative schema to validate that the service 150 is active and ready to receive request from request gateway 110.

If request gateway 110 receives a valid heartbeat response from the service, request gateway 110 may persist the updated declarative schema to a central data store (e.g., schema data store 130) and persist a mapping from the schema to service operations defined by the declarative schema. A graph projection of the API may be reloaded from the schemas, and request gateway 110 may publish a message to other request gateways in the computing environment 100 to propagate the updated declarative schema and mappings from schema to service operations to the other request gateways. The request gateway 110 may subsequently send a message to the service 150 associated with the updated declarative schema to indicate that the updated service has been registered with request gateway 110 and is active.

If, however, request gateway 110 experiences a failure to validate the updated schema or receives an invalid heartbeat response from the updated service 150 (including a failure to receive a heartbeat response from the updated service 150), request gateway 110 may declare the update as a failed update. Request gateway 110 may subsequently transmit a message to the service 150 including an indication that registration of the update failed and reasons why registration of the update failed. Request gateway 110 may further take one or more fallback actions, such as reloading a previous version of the schema or blocking execution of invalid code, so that failures in validating the updated schema do not cause operations within computing environment 100 or at an external service or application invoking these operations within computing environment 100 to fail in an unhandled or unexpected manner.

In some embodiments, request gateway 110 may be configured to manage version drift across different clusters (or "swimlanes") of the same service 150 in computing environment 100, where each cluster may execute different deployments of service code to facilitate a phased rollout of code changes in computing environment 100. Generally, version drift may exist as different services are individually updated and deployed within computing environment 100 to add, remove, and update features exposed by a service. Remote process call-like services may be inherently forward compatible by using an unknown field map that maps unknown data types to the unknown field and by returning null data for output fields that are not supported by a previous version of the service. Request gateway 110 may further be configured to parse a response from any version of a service 150 older than the current version of the service. In some embodiments, over time, request gateway 110 may remove types and fields after a period of deprecation and elimination of the use of these types or fields; however, any removed fields may remain reserved so that future updates cannot re-activate use of the removed fields. Further, to support operations that may not be handled by previous versions of a service, request gateway 110 may be configured to provide error responses to indicate that requested data was served by a previous version of the service.

For legacy RESTful services, request gateway 110 may be configured to avoid a failure to resolve a request having unknown properties. Query strings that include parameters that are implemented by an updated version of the service but are not implemented by older versions of the service may be ignored by the older versions of the service. While this may result in an unexpected response (e.g., a failure to process data according to a filter included in the query string), such responses may be handled by a requesting service or application.

Version drift in graph projections of an API may result in a service throwing a request parse error. Errors may be thrown, for example, when a request references a field from a newer version of a schema exposed by some clusters in computing environment 100 but is not present in a service's declarative schema definition on a servicing cluster on which older code is executed, if an unknown field is provided on an input type, or in other situations in which unknown data is encountered. To handle version drift, request gateway 110 may be configured to filter out unknown data from incoming requests based on the most recent schema definition of each instance of a service 150. Once filtered, request gateway 110 may dispatch the request to the appropriate instance of the service 150 for processing. In some embodiments, request gateway 110 may pass an unmodified request to the service 150, and the service may handle unknown data itself. For example, the service may defer updating its registration with request gateway 110 until all instances are updated, may avoid updates to only some of the servers that implement a service 150, or by implementing a service-specific gateway that exposes the schema associated with service 150 and handles requests corresponding to older versions of the schema itself.

API generator 120 generally uses declarative schemas associated with each of a plurality of services 150 in computing environment 100 to generate and deploy a service controller to each of the services 150 and a graph projection of an API to request gateway 110. Each declarative schema associated with a service generally includes information defining entities maintained by the service. For example, for a service that allows users to create, modify, and retrieve invoices, the service may maintain a definition of an invoice entity including the data elements that any invoice created or modified using the service includes. The information defining entities maintained by the service may include various variable types and references to "golden types" for which a standard definition is maintained across the services in computing environment 100. These "golden types" may define an entity and a format in which data associated with that entity is to be stored. For example, "golden types" may include commonly used information throughout computing environment 100, such as phone numbers, postal addresses, e-mail addresses, national identity numbers, and the like, for which a standard definition is enforced across the services 150 in computing environment 100 allows for the interoperability of the services 150 and the data provided by these services. In some embodiments, entity types defined in a declarative schema may be associated with a defined enumeration of valid values, which API generator 120 can use to build service controllers that ensure that data generated by the service complies with the enumeration of valid values (i.e., that the data is one of the enumerated valid values for a particular data point defined in the declarative schema) and to generate errors that cause the API to fail gracefully if a value does not conform to the enumeration of valid values.

In some embodiments, where appropriate, a declarative schema for a service may include references to entities maintained by other services in computing environment 100. To maintain segregated responsibility for maintenance and a loose coupling of each service in computing environment 100 so that non-contractual changes to one service in computing environment do not adversely affect the functionality of other services, a declarative schema for a service may reference entities in another service using a unique identifier of the service. Because details about entities maintained by other services are not included in the definition of the service, changes to entities maintained by one service may be implemented without modifying the declarative schemas associated with services that use entities maintained by the one service.

The declarative schema associated with a service may additionally include information defining the operations supported by the service. The operations supported by a service may be defined as verbs representing actions that can be performed by invoking the function exposed by the service using a function call defined in the API. Each verb may be associated with an input message and a response message. In this example, the input message may include information identifying data that is used to generate a query against a service data store 155. The input data may be, for example, one or more entities that are used to generate a query against a service data store 155 for an entity, such as a unique identifier associated with a record in a service data store 155 that the service is responsible for maintaining, or non-entity objects. The response message may include information identifying the data that is to be returned in response to invocation of the operation. The response message may be structured as a single entity, as a pageable array of entities (e.g., a list, array, etc.), or as a non-entity object. In some embodiments, each operation may be defined in terms of one or more create, read, update, or delete (CRUD) operations that may be performed by the operation. For example, a read operation may be configured to allow only read operations, a save operation may be configured to allow create or update operations, and a delete operation may be configured to allow only delete operations. The information about the allowed operations, combined with information defining the entities maintained by the service, may allow API generator 120 to automatically generate code that implements the operations defined in the declarative schema, as discussed in further detail below.

In some embodiments, the declarative schema may further include annotations for each operation defined in the declarative schema. The annotations may be used to indicate how an operation defined in the declarative schema can be invoked using functions calls other than a graph function call. For example, the annotations may define REST paths for invoking a function, remote process calls mapped to a RESTful call interface, and the like. By including these annotations, the declarative schema may allow the API generated by API generator 120 and deployed to request gateway 110 to include one or more legacy techniques for invoking functions through the API so that software reliant on these legacy techniques may continue to operate. In some embodiments, the annotations may further include other information that may be used to define security and privacy constraints for each operation defined in the declarative schema. The security and privacy constraints may identify, for example, users or classes of users that are allowed access to certain data defined in an entity, formats of restricted access data that may be returned to a requesting service or application, users or user types associated with each format of the restricted access data, data that is required to be encrypted and/or tokenized prior to being persisted to a data store (e.g., service data store 155), and the like.

Using the declarative schema, API generator 120 generates a specification of a service that various tool chains can use to generate a language object associated with a service. The language object may include information about the messages that are generated for each operation defined in the declarative schema, based in part on the entity definitions included in the declarative schema. Generally, the language object may be considered a programmatic contract that defines the messages generated by the service in response to requests from API gateway 110 and/or one or more services 150. As discussed in further detail below, the messages may be pushed to a message bus 160 to invoke operations on one or more services 150 or store data to data lake 140. Generally, API generator 120 may be configured to generate a single language object for each entity handled by a service to aid in the maintainability of these services. However, in some embodiments, where a service is part of a monolithic service that exposes functionality from multiple related or unrelated services, multiple language objects may be created, where each language object defines a common entity but includes different content according to the responsibilities defined for each service for the common entity. Because multiple language objects may produce type collisions in which an entity defined in one of the multiple language objects conflicts with a definition of the entity in a different one of the multiple language objects, API generator 120 may be configured to handle such type collisions using language-specific option packages.

Using the language object and the declarative schema, API generator 120 generates a specification of a service that a tool chain can use to generate a software artifact, such as source or object code, to implement the service defined by the declarative schema. The tool chain may be selected based on the implementation of the API. For example, Proto may be used to generate a gRPC-based API; SDL may be used to generate a GraphQL-based API; Swagger may be used to generate an OpenAPI-based API; and the like. API generator 120 can generate the software artifact using various compiler tools that are configured to compile the specification of the service into a software artifact in an appropriate programming language. These software artifacts may be compiled as plain old language objects (POLOs) which are bound by limitations of the programming language to which the software artifact is compiled and need not implement or extend functions or objects predefined in the programming language or defined by a different service. The software artifacts may be compiled into various languages such as Java, JavaScript, Python, PHP, or other compiled or interpreted languages that may be appropriate. Once generated, API generator 120 may deploy the software artifact to one or more computing devices to execute the service for which the software artifact was generated. Generally, API generator 120 may be aware of the limitations of the underlying API system (e.g., Proto, SDL, Swagger, etc.) for which API generator 120 is generating a specification of a service can generate specifications that implement abstractions exposed by a declarative specification language that may not be directly supported by the underlying API system.

In some embodiments, the software artifacts may be generated with code that implements various CRUD operations against a service data store 155, as defined in the declarative schema associated with a service. For example, an operation annotated as a read operation may be compiled into a software artifact having one or more instructions to perform a read operation against a service data store 155. In some embodiments, based on an entity definition associated with the entity returned by the read definition, the software artifact may further be generated with code to invoke a read operation on a related service in computing environment 100 (e.g., where an entity references another entity in a service data store 155 for which the service associated with the generated software artifact is only aware of that other entity's existence).

In some embodiments, write operations may be defined as mutating other objects defined in the API. The definition of the write operation generally is defined with asynchronous function in a resolver object that takes any arguments for the write operation and forwarding the arguments to the appropriate service 150.

In some embodiments, the software artifacts may be generated as a code framework that a developer can modify to incorporate custom business logic to perform various tasks when a function is invoked. To do so, API generator 120 can provide the generated software artifact to a developer for editing. The edited software artifact may be received and deployed to the associated service to implement the custom business logic added by the developer of the service.

In some embodiments, API generator 120 may validate a declarative schema for a service prior to compiling the declarative schema into the language object and the software artifact discussed above. Generally, in validating a declarative schema, API generator 120 may examine the declarative schema to identify references to other services and entities in the computing environment 100. As API generator 120 generates entity types from the declarative schema during generation of the language object, API generator 120 determines if the generated entity type already exists in a global schema at request gateway 110. If the generated entity type exists in the global schema, and if the definition of the generated entity type for the service and in the global schema match, API generator 120 can determine that no conflict exists. Otherwise, if the generated entity type for the service is not a strict superset of the entity type in the global schema, API generator 120 can declare that a type conflict exists and fail validation of the declarative schema.

In some embodiments, a service operation defined in a declarative schema may extend a base object defined in another declarative schema by injecting one or more fields into a base entity defined by another declarative schema. Generally, the service operation may provide an input map to indicate which fields of the base entity are required to be passed as an input into the service operation to enable correct resolution of the injected fields. If the base object is not defined in the global schema, API generator 120 can create the base object, with the fields extended to it in another entity. Thus, a warning may be generated for the service associated with the declarative schema being registered. In some embodiments, to minimize registration ordering issues that may arise from declarative schemas extending base objects that do not already exist in the global schema, API generator 120 may persist a current graph projection resolution state so that entities may be resolved and extended without encountering registration ordering issues.

Declarative schema store 130 generally represents a data repository in which declarative schemas for each of the services 150 in computing environment 100 may be stored. Declarative schema store 130 may be structured as a flat data store, a versioned data store, a relational or non-relational database in which declarative schemas are stored as binary large objects (BLOBs), or the like. In some embodiments, to allow service definitions to roll back to a previous definition, declarative schema store 130 may version each copy of a declarative schema for a service and allow a developer of a service 150 to mark a version as a legacy, production, or pre-production version. In some embodiments, declarative schemas marked as a production version may be used by request gateway 110 and API generator 120 to generate a publicly-facing version of the API, while declarative schemas marked as pre-production versions may be combined with other declarative schemas marked as production versions to generate a test version of the API.

Data lake 140 generally represents a data repository in which entities maintained by each of the services 150 in computing environment 100 may be stored. Generally, each entity in data lake 140 may be structured according to an entity definition included in a declarative schema associated with one of the plurality of services 150 in computing environment 100. The format of data structures ingested for storage in data lake 140 may be defined according to a global data dictionary that includes information about each entity that is defined in the plurality of declarative schemas so that data consistency across various services may be enforced. Internal services 150 within computing environment 100 that rely on or otherwise reference data from other services may be guaranteed to receive data from data lake 140 or a service data store 155 in a particular format. Applications that use data from data lake 140, such as machine learning applications, may be guaranteed to receive clean data from data lake 140 without needing to guess at the contents of any data payload received from a service 150 or the format of the data in the data payload.

Data stored in data lake 140 may be generated according to a variety of data formats that may have varying features. For example, newer data formats may include data fields that are not found in older data formats and may remove data fields that were rarely used or are otherwise deprecated. Thus, each object stored in data lake 140 may include versioning information for the version of the schema that the object conforms to. A data dictionary, which includes information about all versions of the schemas used to define data stored in data lake 140, may be used by services 150 to interpret the data objects persisted to data lake 140 according to the appropriate schema.

Services 150 are representative of one or more services or microservices deployed in computing environment 100 to expose functionality to applications or services internal or external to computing environment 100. Services 150 may be deployed on individual physical machines, individual virtual machines, clusters of physical or virtual machines, containers executing on one or more virtual machines, or the like.

As discussed above, each service 150 may be associated with a declarative schema defining the entities and operations exposed by the service. When a service 150 receives a request from request gateway 110, service 150 may retrieve data from its associated service data store 155. The data retrieved from service data store 155 may be parsed to identify references to other entities that are to be resolved. Generally, a reference to another entity to be resolved may include an entity identifier, which may be an identifier unique to computing environment 100 or a globally unique identifier. Based on the entity identifier, service 150 can generate a message to the service associated with the entity identified by the entity identifier to request resolution of an object based on one or more additional parameters included in the data retrieved from service data store 155. This message may be published on message bus 160 and consumed by the target service for processing. In response, the service 150 may receive a message, on message bus 160, including the requested data, and the service may replace references to the other entity in the data retrieved from a service data store 155 with the requested data included in the received message.

Service data store 155 generally provides a repository in which data associated with a particular service 150 is stored. Generally, service data store 155 may be designated a source of truth for data maintained by a service. When data is written to service data store 155, service 150 can emit a data commit message on message bus 160 to commit data to data lake 140, which, as discussed, may serve as a repository in which data maintained by the services 150 may be stored for use in various other applications, such as machine learning applications.

Message bus 160 generally represents a conduit through which services 150 perform inter-service communications (e.g., to invoke events at other services 150 to retrieve data from the appropriate service data stores 155) and notify data lake 140 of changes to data. Generally, message bus 160 may carry one or more messages defined according to message specifications generated by API generator 120 between different services. In some embodiments, message bus 160 may broadcast messages for consumption by the service 150 identified in a header or body of a message. In other embodiments, message bus 160 may route messages published on the message bus by a service 150 to a target service identified in the header or body of a message.

Figure 2:
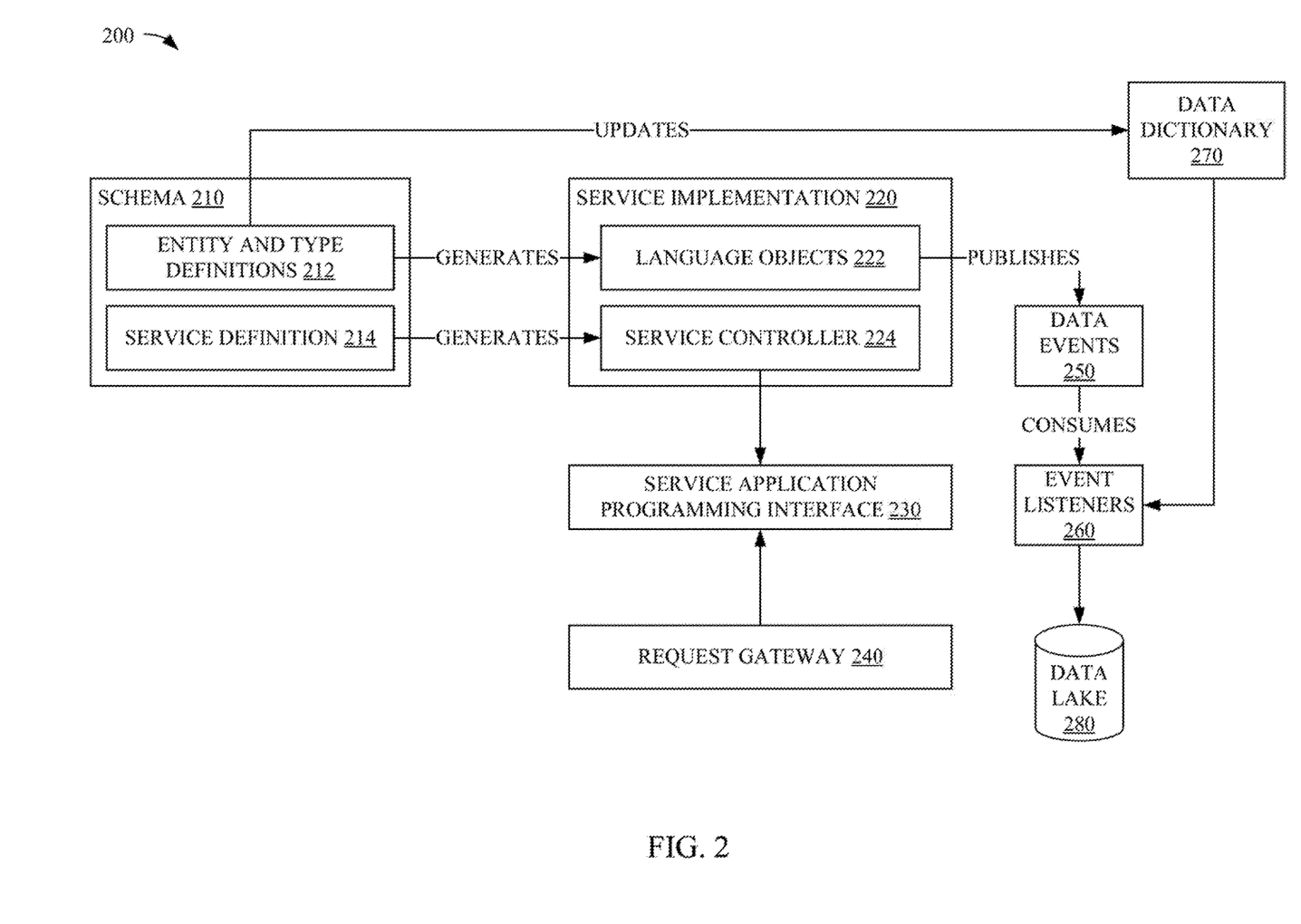
FIG. 2 illustrates an example entity data model for generating an API based on a declarative schema for an individual service in a computing environment.

Example Entity Data Model for Generating Application Programming Interfaces Based on Declarative Schemas FIG. 2 illustrates an example data model 200 used in a computing environment for a service in an application programming interface generated based on declarative schemas. As illustrated, data model 200 includes a schema 210, a service implementation 220, a service application programming interface (API) 230, a request gateway 240, data events 250, event listeners 260, a data dictionary 270, and a data lake 280.

Schema 210 is representative of a declarative schema that defines the entities and operations exposed by a service, as discussed above. As illustrated, schema 210 includes entity and type definitions 212 and service definitions 214.

Entity and type definitions 212 generally define each of the entities used by a service. Each entity may have a name and a type associated with the entity. The type may be, for example, a primitive data type supported by a programming language, such as a floating point number, integer, Boolean value, string, character or array of characters, or other basic data types. In some embodiments, the type may be a custom object defined within the API. The custom object type may include a variety of properties or attributes, which may be primitive data types or other objects. In some embodiments, entity and type definitions 212 may use one or more "golden types", or entity definitions that are defined a priori within the API to enforce consistency across services.

Service definition 214 defines operations implemented by a service using one or more of the entities and/or types defined in entity and type definitions 212. Generally, each operation may be defined as a verb or other action word that identifies, at least broadly, what action the operation performs. Further, each operation generally includes information specifying input data objects and output data objects. The input data objects generally represent information that the operation operates on or otherwise uses to generate a result. Generally, input data objects may be received from a request gateway 240 or as a message published on a message bus by a service within the API. Output data objects may be transmitted to a requesting service or application through request gateway 240 or as a response to a message published on a message bus by a service within the API. Both input data objects and output data objects may conform to an entity specification for the data objects specified within the API so that a service can assume that any data it receives conforms to a standard defined within the API.

Generally, entity and type definitions 212 and service definition 214 may be used to create language objects 222 within service implementation 220. In some embodiments, language objects 222 may be created by one or more tool chains using a system-specific specification (e.g., for a particular implementation of an API, such as gRPC, GraphQL, OpenAPI, etc.) generated from the entity and type definitions 212 and service definition 214. Language objects 222 may define, for example, the format of messages published on a message bus within the application programming interface. The format of these messages may be generated within service implementation 220 by a message compiler that compiles entity and type definitions 212 in schema 210 to a language object representing language objects 222. The language object generally defines a message as a collection of data primitives or objects, with each data primitive or object having a name associated therewith.

Entity and type definitions 212 and service definition 214 may also be used to create data dictionary 270. Data dictionary 270, as discussed, generally includes information defining the formats of data objects expected to be placed on a message bus and persisted to a data lake. The information in data dictionary 270 may be, for example, implementation-specific schema descriptions formatted in a variety of formats that can be used in parsing the contents of any message placed on a message bus, such as a JavaScript Object Notation (JSON) schema, AVRO, etc.

Service definition 214 may be compiled into a software artifact representing service controller 224. The software artifact may be an abstract implementation in a target language used by the system, such as a Java class, a PHP script, a Python script, or any other code in source or object form that may be deployed for execution on a physical or virtual server or container executing on a physical or virtual server. Service controller 224 generally includes one or more functions corresponding to each of the operations specified in the service definition 214. Each function may include code generated based on annotations associated with each operation defining whether the function is a create, read, update, or delete operation. For example, create operations may be generated by including code that causes a record to be written to data lake 280. Read operations may be generated by including code that causes a record to be retrieved from data lake 280. Update operations may be generated by including code that identifies a record in data lake 280 and one or more fields to be updated in the record. Finally, delete operations may be generated by including code that causes a record to be deleted from data lake 280. In some embodiments, the annotations may further be used to include code that performs various security and privacy checks to ensure that a party requesting data from the service is actually entitled to retrieve the data, redact data to prevent personally identifiable information from being compromised, and other security and privacy operations.

Service controller 224 generally interfaces with service application programming interface (API) 230 to expose the operations implemented by the service. Generally, service API 230 serves as an intermediary between request gateway 240 and service controller 224. In this architecture, an external service or application invokes a function in the API through request gateway 240. Using routing information generated from the declarative schemas, request gateway 240 routes a received request to service API 230, which then invokes the function defined by service controller 224. Service controller 224 generates a result, which is pushed to service API 230, and service API 230 in turn provides the generated result to request gateway 240 for dispatch to the requesting service or application.

When service implementation 220 processes a request, service implementation 220 publishes one or more language objects to data events 250. Data events 250 generally represent messages published on a message bus between different services to retrieve information from a related service (i.e., a service that owns an entity referenced in an entity definition in the schema 210). Data events 250 are generally consumed by event listeners 260, which listen for messages addressed to service implementation 220 that are published on the message bus connecting the services exposed by an API. Event listeners 260 use an entity definition published in data dictionary 270 and data lake 280 to retrieve entity records from data lake 280 and publish one or more messages on the message bus to obtain related data from one or more other services.

In some embodiments, schema 210 may be used to generate a complete implementation of a given specification. For example, a GraphQL server implementation that resolves a graph by calling to a downstream service may be generated from schema 210. To do so, an API generator can aggregate the individual schemas for each service in an API and generate a complete service implementation 220 for the entire API. Graphs generated from such a schema 210 for a complete implementation of a given specification can use information in an operation defining the relationship of the operation with parent data types and/or operations to generate calls to one or more downstream services in order to retrieve and/or modify the underlying data objects used by the operation. In some embodiments, the operations may be structured as a pass-through conduit through which arguments used by operations at downstream services are received in a request to perform an operation by a higher-level service and passed to the downstream services.

Figure 3:
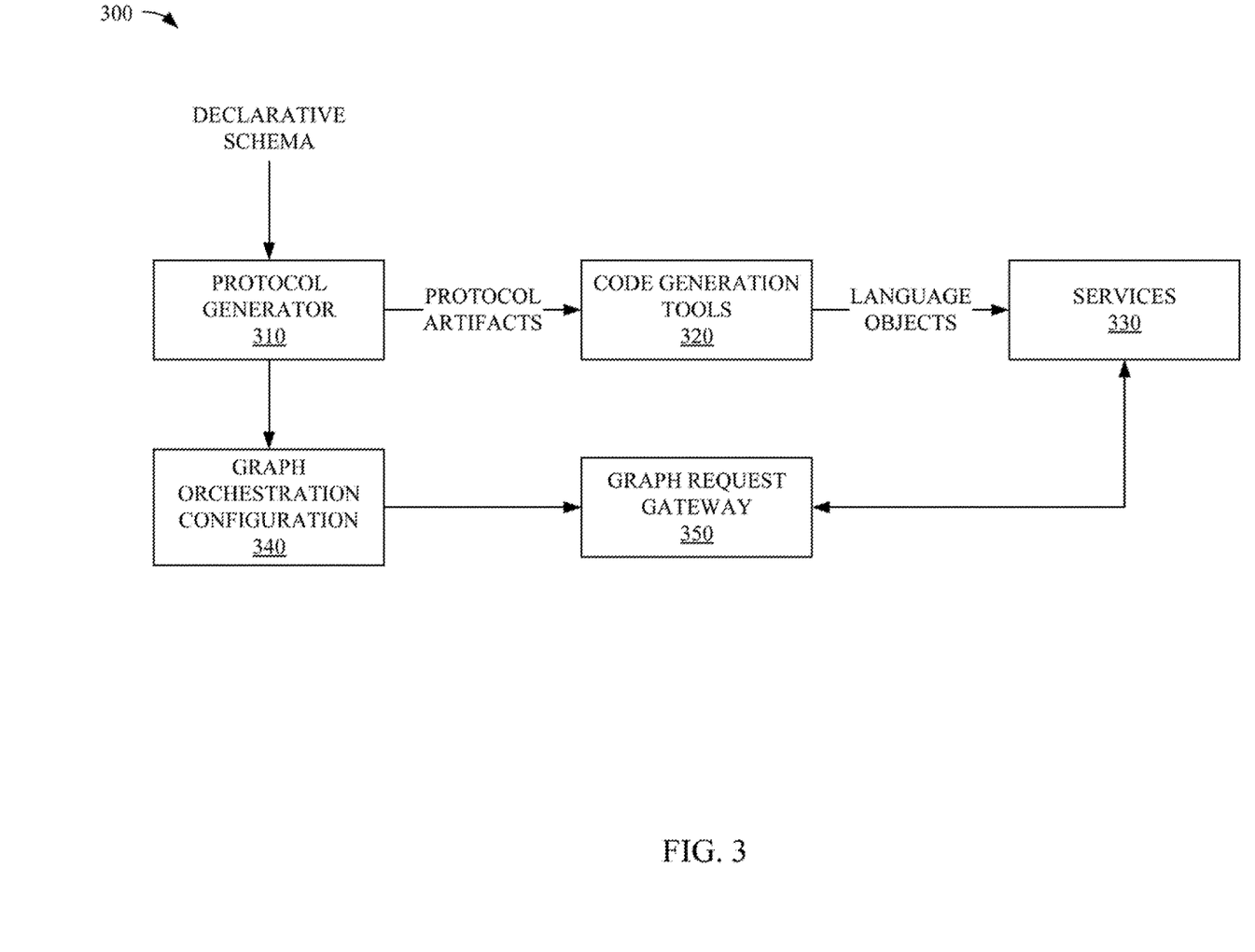
FIG. 3 illustrates an example pipeline for generating a service and deploying an API associated with the service based on a declarative schema for the service.

Example Pipeline for Generating a Service Based on Declarative Schemas for the Service FIG. 3 illustrates an example pipeline 300 for building services exposed by an API based on declarative schemas for each service. As discussed, each service in the API may be loosely coupled so that changes to one service have little or no effect on the operation of other services in the API.

As illustrated pipeline 300 begins with a protocol generator 310. Protocol generator 310 takes a declarative schema for a service as input. As discussed, the declarative schema generally includes a definition of entities and types maintained by a service and operations exposed by the service. Protocol generator 310 compiles the declarative schema into protocol objects defining the messages published by the service on a message bus. Protocol generator 310 can compile the declarative schema into a protocol object that represents a language-agnostic definition of the service, such as a protocol buffer definition (e.g., a .proto3 file), and can be used, in conjunction with the information the declarative schema defining the operations supported by the service, to generate a language object implementing the service, as discussed in further detail below. Generally, as discussed above, protocol generator 310 may be aware of the limitations of the underlying protocol for which protocol generator 310 is generating a protocol object and can generate specifications that implement abstractions exposed by the declarative schema that may not be directly supported by the underlying API system.

After protocol generator 310 generates a protocol object programmatically defining the messages published by the service, the protocol object is provided to code generation tools 320. Code generation tools 320 are generally configured to generate a language object as source or object code to implement the various operations defined for the service using the message definitions in the protocol object generated by protocol generator 310. Generally, code generation tools 320 may use information about other objects referenced by entities in the declarative schema to generate code for publishing data request messages on a message bus connecting the services in the API and code for generating responses to API queries including the information retrieved from the other services in the API in response to the published data request messages. The language objects generated by code generation tools may be in any desired language. For example, where a service is deployed as a web service, the language objects may be generated as JavaScript code, Python code, Ruby code, Java code, PHP scripts, or other languages that may be used to implement services executing on a web server. In other examples, the language objects may be generated as source code to be compiled into deployable object code using an external compiler, such as source code written in the C++ programming language, the Java programming language, etc. Language objects generated by code generation objects may be deployed to one or more physical and/or virtual servers to deploy services 330 for execution.

In parallel, protocol generator 310 generates graph orchestration configuration 340. Graph orchestration configuration 340 generally includes a description of the graph defining a service and information about the service operations to invoke for any part of the graph defining the service, as well as how the graph associated with the service can be composed into a larger graph. The graph orchestration configuration 340 may be provided to graph request gateway 350, which composes the graph for the service together with graphs for other services in the API to allow external services or applications to interface with the services defined using the declarative schemas.

Graph request gateway 350 generally serves as a point of entry at which external services or applications interface with the services defined using the declarative schemas through one or more API calls. Graph request gateway 350 generally processes each request to identify the entity requested by the request and the service that owns the requested entity and dispatches the request to the identified service for processing. In response, graph request gateway 350 receives an object or collection of objects to return to the requesting external service or application, according to an entity definition in the declarative schema.

Figure 4:
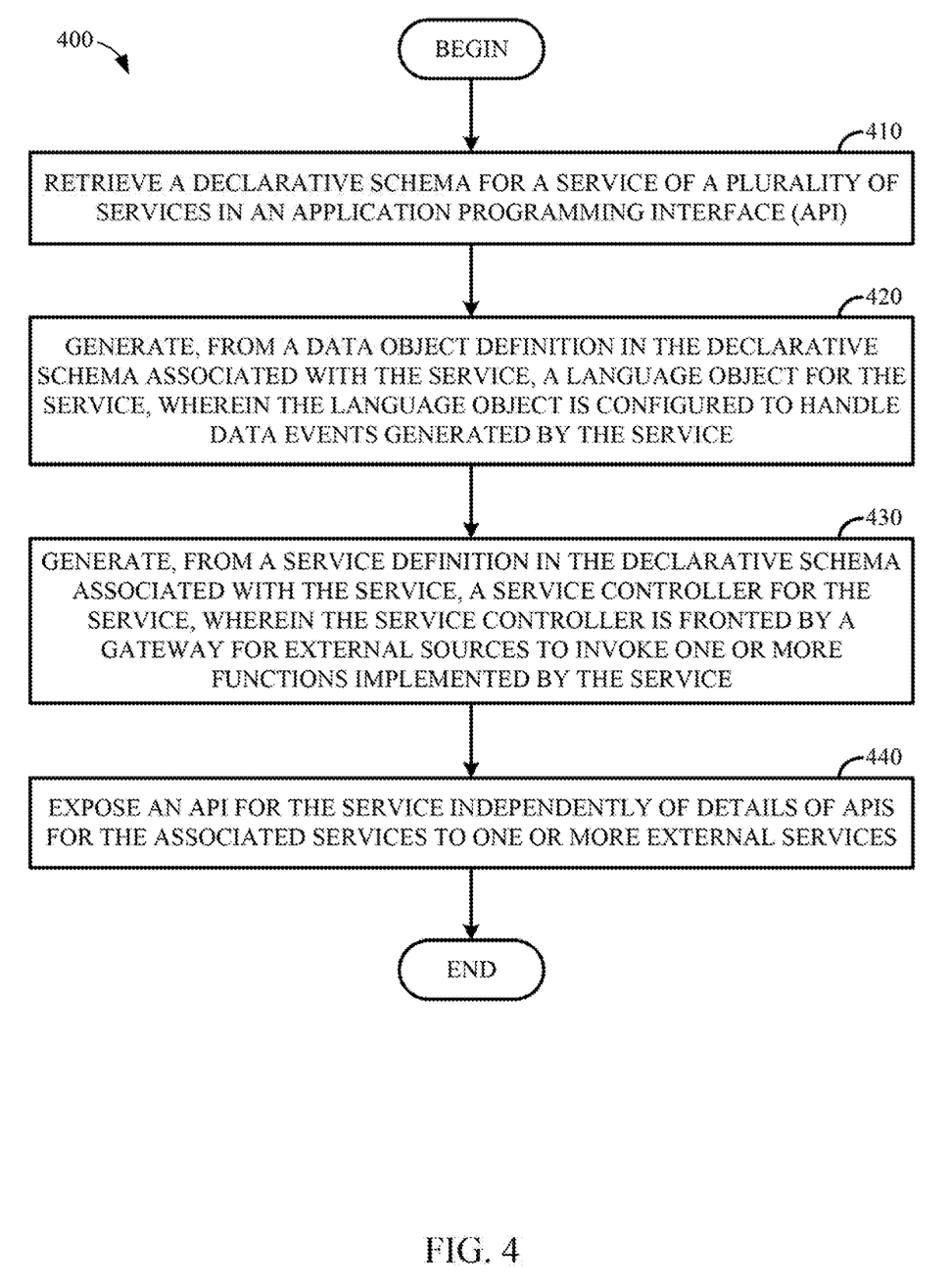
FIG. 4 illustrates example operations for generating an API based on declarative schemas for a service in a collection of services.

Example Computer-Implemented Method for Generating Application Programming Interfaces Based on Declarative Schemas FIG. 4 illustrates example operations 400 for generating an application programming interface based on declarative schemas for a service in a collection of services. The operations described herein may be performed at a request gateway and/or an API generator (e.g., request gateway 110 and/or API generator 120 illustrated in FIG. 1) or on a computing device implementing a unified request gateway and API generator.

As illustrated, operations 400 begin at block 410, where a system retrieves a declarative schema for a service of a plurality of services in an application programming interface (API). In some embodiments, the system can retrieve the declarative schema from a centralized schema data store (e.g., schema data store 130 illustrated in FIG. 1). The system can retrieve the declarative schema for the service in response to a request to generate an API from a set of declarative schemas designated a production schemas or in response to a request received from a service to update the schema associated with the service. In some embodiments, the request received from a service to update the schema may include the updated declarative schema or information identifying a location at which the updated schema may be retrieved.

At block 420, the system generates, from a data object definition in the declarative schema associated with the service, a language object for the service. The language object is generally configured to handle data events generated by the service. As discussed, the language object may be generated by compiling the declarative schema into a protocol file that defines the messages emitted by and expected to be received by the service. The messages may be defined as a collection of data to be included in a message, with each element of the message having a name and a type associated with the element. The type may be a primitive construct supported by a programming language or an entity defined in the API. In some embodiments, the context of a service declaration may affect specific details of the language object generated for the service. The language object may be generated by reading the declarative schema associated with the service and recursively resolving data object definitions referenced by the service itself or by other objects referenced by the objects referenced by the service.

At block 430, the system generates, from a service definition in the declarative schema associated with the service, a service controller for the service. The service controller exposes a gateway for external sources to invoke one or more functions implemented by the service. In some embodiments, the service controller may include functions and a framework for adding custom business logic to satisfy each operation defined in the declarative schema according to annotations associated with each operation. The annotations defined for each operation may indicate, for example, CRUD functions that the operation implements, as well as security and privacy annotations for controlling and modifying the data returned by each operation, and other information that can be used to modify the code generated to implement the service controller. In some embodiments, the service controller may further be generated based on the generated language object, which may provide a framework for emitting and consuming messages on a message bus connecting the services in the API.

At block 440, the system exposes an API for the service independently of details of APIs for the associated services to one or more external services. For example, the API for the service may be exposed to a request gateway that serves as a single point of entry for external services to invoke operations in the API, as well as other services within the API that rely on entities owned and maintained by the system. In some embodiments, exposing the API for the service may include deploying the service to an API request gateway internal to the API service which receives requests for processing from the request gateway serving as a single point of entry at which external services invoke operations in the API.

In some embodiments, the language object generated from the data object definition may include one or more functions for publishing events to a cross-service message bus. The language object may further include one or more functions for handling receiving and processing one or more events invoked by one or more of the associated services.

In some embodiments, the data object definition may include references to data objects implemented by one or more of the associated services. In some embodiments, the language object may handle data events by identifying, from the references to data objects implemented by the one or more of the associated services, target services to query for referenced data objects. The language object can publish one or more events on a cross-service message bus to request data from the target services, combine data associated with the service with data retrieved from the target services into a request payload, and transmit the request payload to a requesting service.

In some embodiments, the system may update the declarative schema for the service and a projection of the API exposed to external services and applications through a request gateway serving as a single point of entry for the external services to invoke operations in the API. To do so, during operation of the API, the system may retrieve an update to the declarative schema for the service. The system generally validates that the updated declarative schema for the service is backwards compatible with a previous version of the declarative schema for the service. An update language object and an updated service controller may be generated based on the updated and verified declarative schema. The system invokes a heartbeat service at the service to validate that the service is updated and ready to receive requests from the API gateway. The system receives a successful response from the heartbeat service, and based on receipt of the successful response, the system reloads a graph schema based on the updated declarative schema and generates a message bus event to one or more other API gateways to update graph schemas at the one or more other API gateways.

In some embodiments, the system can validate that references in the declarative schema to other services are valid and resolvable through a cross-service message bus (e.g., message bus 160 in FIG. 1) connecting the service to the other services. Based on a failure to validate that the references in the declarative schema to other services are valid and resolvable, the system can take one or more fallback actions to ignore invalid references in the declarative schema. The fallback action may include, for example, reverting to a service defined by a previous version of the declarative schema or blocking execution of code including invalid references in the declarative schema.

In some embodiments, the system may further generate, from a plurality of schema definitions for a plurality of services, a graph projection of operations in the API. The graph projection may include an API gateway or other point of entry into the API as a root node and with each branch of the graph projection terminating at a data lake.

In some embodiments, write operations defined in the graph projection may be defined as descendants of a mutation object exposed by the service.

In some embodiments, read operations may include information annotating a location in the graph projection at which the read operations are exposed. In some embodiments, read operations may further include information defining extensions to a referenced type of data. The read operations may further include information indicating paging parameters for an input field in operations that return an array of data. Still further, the read operations may include annotations indicating how to process a data filter for a given operation.

Example Operations for Updating a Service Based on Updated Declarative Schemas

Figure 5:
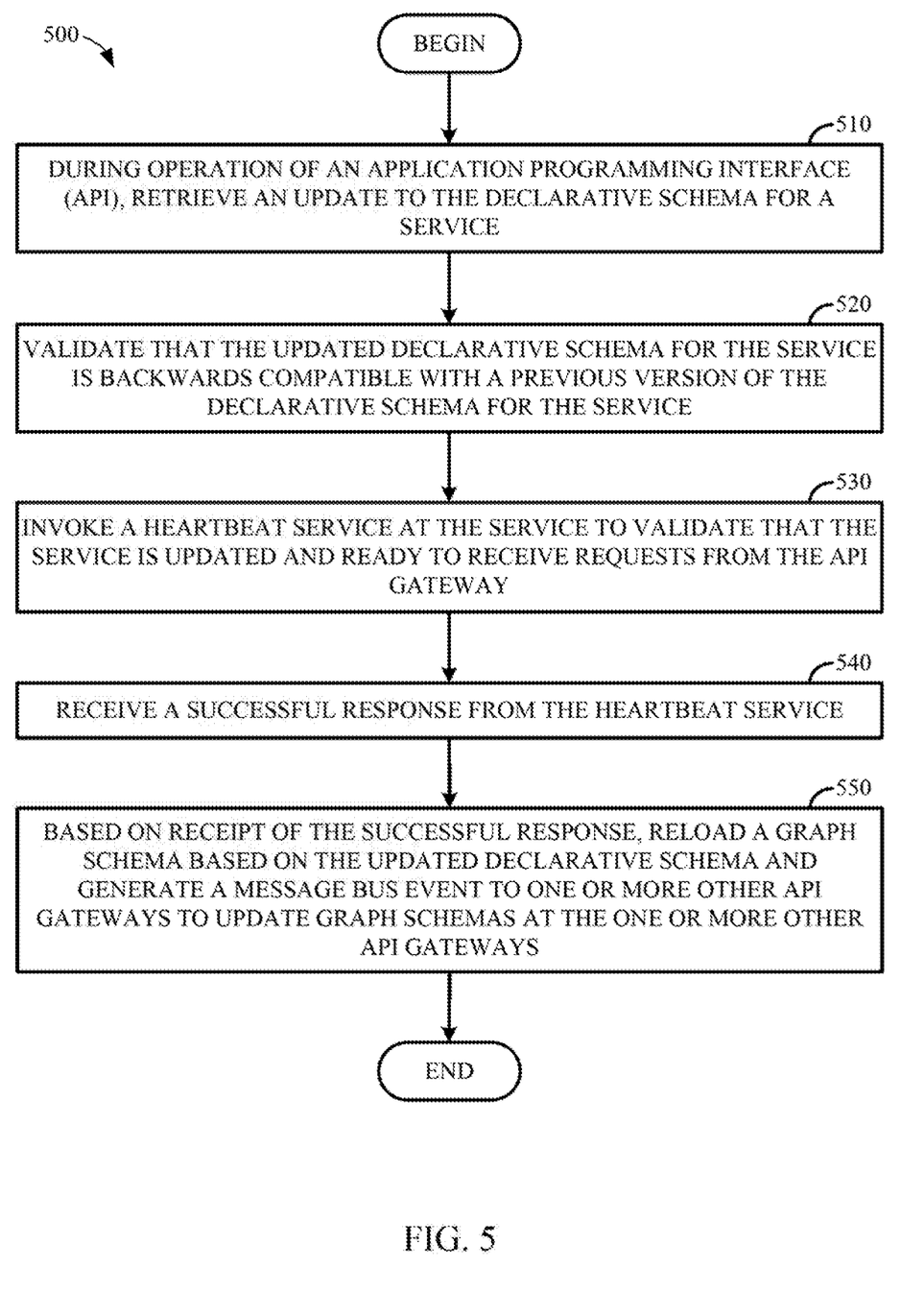
FIG. 5 illustrates example operations for updating a service based on an updated declarative schema during operations of an API.

FIG. 5 illustrates example operations 500 for updating a service based on an updated declarative schema during operations of an API request gateway and the services behind the API request gateway. The operations described herein may be performed at a request gateway and/or an API generator (e.g., request gateway 110 and/or API generator 120 illustrated in FIG. 1) or on a computing device implementing a unified request gateway and API generator.

As illustrated, operations begin at block 510, where, during operation of an API request gateway, a system retrieves an update to the declarative schema for a service. The update to the declarative schema for the service may be retrieved based on a periodic scan of a centralized repository (e.g., declarative schema store 130 illustrated in FIG. 1) in which declarative schemas are stored or in response to a request to update a service and register the updated service received from the updated service.

At block 520, the system validates that the updated declarative schema for the service is backwards compatible with a previous version of the declarative schema for the service. Generally, validating that the updated declarative schema is backwards compatible with a previous version of the declarative schema includes examining entity types defined in the updated declarative schema and previous versions of the declarative schema. If an entity definition in the updated declarative schema includes specifications that conflict with the entity definition in a previous version of the declarative schema (e.g., references a different object, has the potential to cause a data type overflow or underflow, etc.) or omits previously included data elements, the system can fail the validation and cause the system to roll back to a previous version of the declarative schema for the service. Otherwise, the system can validate that the updated declarative schema for the service is backwards compatible, compile language objects and service controllers for the object, and deploy the compiled language objects and service controllers.

At block 530, the system invokes a heartbeat service at the service to validate that the service is updated and ready to receive requests from the API gateway.

At block 540, the system receives a successful response from the heartbeat service. Generally, a successful response from the heartbeat service may include a response that conforms to a predefined format that is received within a timeout period from invoking the heartbeat service at block 530.

At block 550, based on receipt of the successful response, the system reloads a graph schema at the API gateway based on the updated declarative schema. The system additionally generates a message bus event to one or more other API gateways to update graph schemas at the one or more other API gateways. Generally, to reload a graph schema at the API gateway, the system stitches together a graph projection of the API from declarative schemas associated with each service for which that the API gateway exposes operations. The system can use a previously-generated graph schema as a base from which the updated graph schema is generated. The previously-generated graph schema may be augmented by a definition of the entities and operations included in the updated declarative schema to reflect changes to the service included in the updated schema.

Figure 6:
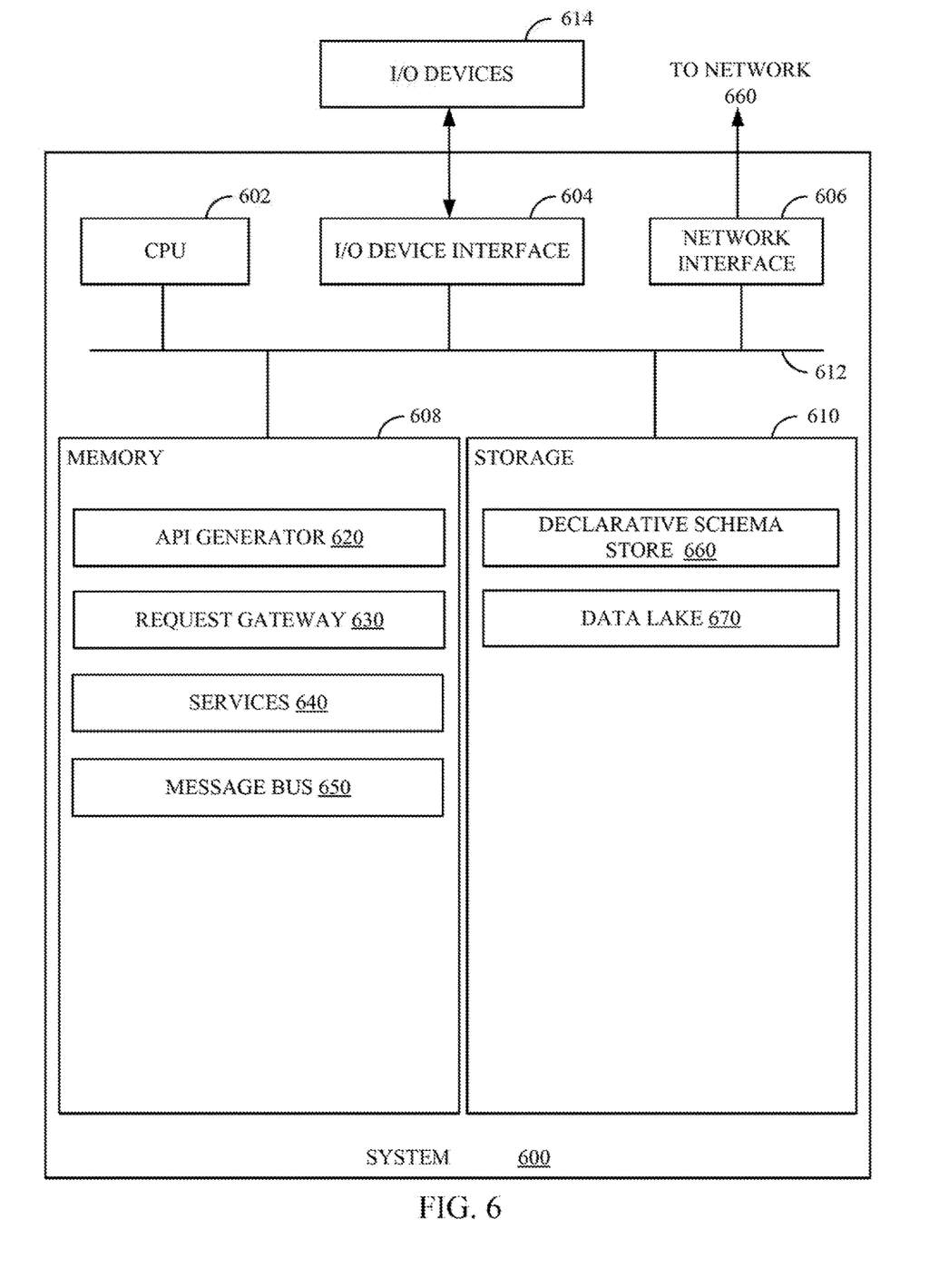
FIG. 6 illustrates an example computing system on which embodiments of the present disclosure may be implemented.

Example Systems for Generating an Application Programming Interface Based on Declarative Schemas for Services in a Collection of Services FIG. 6 illustrates an example system 600 that can generate an API from declarative schemas for services in a collection of services and process API function calls from external services or applications using the generated API. For example, system 600 may comprise one or both of request gateway 110 and/or API generator 120 illustrated in FIG. 1.

As shown, system 600 includes a central processing unit (CPU) 602, one or more I/O device interfaces 604 that may allow for the connection of various I/O devices 616 (e.g., keyboards, displays, mouse devices, pen input, etc.) to the client 600, network interface 606 through which client 600 is connected to network 690 (which may be a local network, an intranet, the internet, or any other group of computing devices communicatively connected to each other), a memory 608, storage 610, and an interconnect 612.

CPU 602 may retrieve and execute programming instructions stored in the memory 608. Similarly, the CPU 602 may retrieve and store application data residing in the memory 608. The interconnect 612 transmits programming instructions and application data, among the CPU 602, I/O device interface 604, network interface 606, memory 608, and storage 610.

CPU 602 is included to be representative of a single CPU, multiple CPUs, a single CPU having multiple processing cores, and the like.

Memory 608 is representative of a volatile memory, such as a random access memory, or a nonvolatile memory, such as nonvolatile random access memory, phase change random dom access memory, or the like. As shown, memory 608 includes an API generator 620, request gateway 630, services 640, and message bus 650. API generator 620 generally uses declarative schemas associated with services 640 to build language objects defining messages and data objects generated by a service and to build a service controller that includes code for performing operations defined in a declarative schema for a service. The language objects and service controllers generated for the declarative schemas may be deployed to one or more physical or virtual machines hosting the services to expose the functionality of each of these services to external services or applications through request gateway 630.

Request gateway 630 generally composes a graph projection of an API together from the declarative schemas defining each service in the API and exposes the graph projection of the API to external services or applications. Generally, the graph projection generated by request gateway 630 may include information about a variety of navigable paths through an API that may be traversed to perform a particular operation defined in the declarative schemas for the services. The graph projection may be periodically updated as new services are brought online and as updates are performed in respect of existing services in the API.

Services 640 are generally representative of programs or other application code that executes on system 600 to implement functionality defined by the declarative schemas and exposed to external services or applications by request gateway 630. Generally, services 640 may receive a request from an external service or application via request gateway 630 based on information in the graph projection identifying the service response for handling of a request. Where a request includes references to entities maintained by other services, the service handling the request can publish a message on message bus 650 to retrieve specified data from data lake 670 via the appropriate service.

Storage 610 is representative of a non-volatile memory, such as a disk drive, solid state drive, or a collection of storage devices distributed across multiple storage systems. Although shown as a single unit, the storage 610 may be a combination of fixed and/or removable storage devices, such as fixed disc drives, removable memory cards or optical storage, network attached storage (NAS), or a storage area-network (SAN). Storage 610, as illustrated, may include a declarative schema store 660 and a data lake 670. Declarative schema store 660 generally serves as a repository in which declarative schemas defining services 640 are stored. Data lake 670 generally services as a repository in which data generated and maintained by the services 640 are stored for future retrieval.

The preceding description is provided to enable any person skilled in the art to practice the various embodiments described herein. Various modifications to these embodiments will be readily apparent to those skilled in the art, and the generic principles defined herein may be applied to other embodiments. For example, changes may be made in the function and arrangement of elements discussed without departing from the scope of the disclosure. Various examples may omit, substitute, or add various procedures or components as appropriate. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

A processing system may be implemented with a bus architecture. The bus may include any number of interconnecting buses and bridges depending on the specific application of the processing system and the overall design constraints. The bus may link together various circuits including a processor, machine-readable media, and input/output devices, among others. A user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer-readable medium. Software shall be construed broadly to mean instructions, data, or any combination thereof, whether referred to as software, firmware, middleware, microcode, hardware description language, or otherwise. Computer-readable media include both computer storage media and communication media, such as any medium that facilitates transfer of a computer program from one place to another. The processor may be responsible for managing the bus and general processing, including the execution of software modules stored on the computer-readable storage media. A computer-readable storage medium may be coupled to a processor such that the processor can read information from, and write information to, the storage medium. In the alternative, the storage medium may be integral to the processor. By way of example, the computer-readable media may include a transmission line, a carrier wave modulated by data, and/or a computer readable storage medium with instructions stored thereon separate from the wireless node, all of which may be accessed by the processor through the bus interface. Alternatively, or in addition, the computer-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module, it will be understood that such functionality is implemented by the processor when executing instructions from that software module.

The following claims are not intended to be limited to the embodiments shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112(f) unless the element is expressly recited using the phrase "means for" or, in the case of a method claim, the element is recited using the phrase "step for." All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A method for generating an application programming interface (API) for a plurality of associated services, comprising:
   retrieving a declarative schema for a service of a plurality of services in an API;
   generating, from a data object definition in the declarative schema associated with the service, a language object for the service, wherein:
      the language object is configured to handle data events generated by the service, and
      the data object definition comprises references to data objects implemented by one or more of the associated services;
   generating, from a service definition in the declarative schema associated with the respective service, a service controller for the service, wherein the service controller is fronted by a gateway for external sources to invoke one or more functions implemented by the service; and
   exposing an API for the service independently of details of APIs for the associated services to one or more external services.

2. The method of claim 1, wherein the language object comprises:
   one or more functions for publishing events to a cross-service message bus, and
   one or more functions for handling receiving and processing one or more events invoked by one or more of the associated services.

3. The method of claim 1, wherein the language object is configured to handle data events by:
   identifying, from the references to data objects implemented by the one or more of the associated services, target services to query for referenced data objects;
   publishing one or more events on a cross-service message bus to request data from the target services;
   combining data associated with the service with data retrieved from the target services into a request payload; and
   transmitting the request payload to a requesting service.

4. The method of claim 1, further comprising:
   during operation of an API request gateway exposing the API, retrieving an update to the declarative schema for the service;
   validating that the update to the declarative schema for the service is backwards compatible with a previous version of the declarative schema for the service;
   generating an updated language object and an updated service controller based on the updated declarative schema;
   invoking a heartbeat service at the service to validate that the service is updated and ready to receive requests from the API gateway;
   receiving a successful response from the heartbeat service; and
   based on receipt of the successful response, reloading a graph schema based on the updated declarative schema and generating a message bus event to one or more other API gateways to update graph schemas at the one or more other API gateways.

5. The method of claim 1, further comprising:
   validating that references in the declarative schema to other services are valid and resolvable through a cross-service message bus connecting the service to the other services; and
   based on a failure to validate that the references in the declarative schema to other services are valid and resolvable, taking fallback actions to ignore invalid references in the declarative schema.

6. The method of claim 5, wherein the fallback actions comprise one of:
   reverting to a service defined by a previous version of the declarative schema; or
   blocking execution of code including invalid references in the declarative schema.

7. The method of claim 1, further comprising: generating, from a plurality of schema definitions for a plurality of services, a graph projection of operations in the API, the graph projection including an API gateway as a root node and with each branch of the graph projection terminating at a data lake.

8. The method of claim 7, wherein write operations defined in the graph projection are defined as descendants of a mutation object exposed by the service.

9. The method of claim 7, wherein read operations annotate a location in the graph projection at which the read operations are exposed.

10. The method of claim 9, wherein the read operations further include information defining extensions to a referenced type of data.

11. The method of claim 9, wherein the read operations further include information indicating paging parameters for an input field in operations that return an array of data.

12. The method of claim 9, wherein the read operations further include annotations indicating how to process a data filter for a given operation.

13. The method of claim 1, further comprising:
removing, from the API, unused types and fields after a deprecation period; and
marking the removed unused types and fields as reserved such that the unused types and fields cannot be re-activated in a future version of the API.

14. A system, comprising:
a processor; and
a memory having instructions stored thereon which, when executed by the processor, performs an operation for generating an application programming interface (API) for a plurality of associated services, the operation comprising:
retrieving a declarative schema for a service of a plurality of services in an API;
generating, from a data object definition in the declarative schema associated with the service, a language object for the service, wherein:
the language object is configured to handle data events generated by the service, and
the data object definition comprises references to data objects implemented by one or more of the associated services;
generating, from a service definition in the declarative schema associated with the respective service, a service controller for the service, wherein the service controller is fronted by a gateway for external sources to invoke one or more functions implemented by the service; and
exposing an API for the service independently of details of APIs for the associated services to one or more external services.

15. The system of claim 14, wherein the language object comprises one or more functions for publishing events to a cross-service message bus, and one or more functions for handling receiving and processing one or more events invoked by one or more of the associated services.

16. The system of claim 15, wherein the language object is configured to handle data events by:
identifying, from the references to data objects implemented by the one or more of the associated services, target services to query for referenced data objects;
publishing one or more events on a cross-service message bus to request data from the target services;
combining data associated with the service with data retrieved from the target services into a request payload; and
transmitting the request payload to a requesting service.

17. The system of claim 14, wherein the operation further comprises:
during operation of an API request gateway exposing the API, retrieving an update to the declarative schema for the service;
validating that the update to the declarative schema for the service is backwards compatible with a previous version of the declarative schema for the service;
generating an updated language object and an updated service controller based on the updated declarative schema;
invoking a heartbeat service at the service to validate that the service is updated and ready to receive requests from the API gateway;
receiving a successful response from the heartbeat service; and
based on receipt of the successful response, reloading a graph schema based on the updated declarative schema and generating a message bus event to one or more other API gateways to update graph schemas at the one or more other API gateways.

18. The system of claim 14, wherein the operation further comprises:
validating that references in the declarative schema to other services are valid and resolvable through a cross-service message bus connecting the service to the other services; and
based on a failure to validate that the references in the declarative schema to other services are valid and resolvable, taking fallback actions to ignore invalid references in the declarative schema.

19. The system of claim 14, wherein the operation further comprises: generating, from a plurality of schema definitions for a plurality of services, a graph projection of operations in the API, the graph projection including an API gateway as a root node and with each branch of the graph projection terminating at a data lake.

20. A non-transitory computer-readable medium having instructions stored thereon which, when executed by a processor, performs an operation for generating an application programming interface (API) for a plurality of associated services, the operation comprising:
retrieving a declarative schema for a service of a plurality of services in an API;
generating, from a data object definition in the declarative schema associated with the service, a language object for the service, wherein:
the language object is configured to handle data events generated by the service, and
the data object definition comprises references to data objects implemented by one or more of the associated services;
generating, from a service definition in the declarative schema associated with the respective service, a service controller for the service, wherein the service controller is fronted by a gateway for external sources to invoke one or more functions implemented by the service; and
exposing an API for the service independently of details of APIs for the associated services to one or more external services.

* * * * *